(12) United States Patent
Bernardos et al.

(10) Patent No.: US 11,882,092 B2
(45) Date of Patent: Jan. 23, 2024

(54) METHODS FOR SPECIFYING THE TYPE OF MAC ADDRESS WITH DYNAMIC ASSIGNMENT MECHANISMS

(71) Applicant: INTERDIGITAL PATENT HOLDINGS, INC., Wilmington, DE (US)

(72) Inventors: Carlos Jesus Bernardos, Madrid (ES); Alain Mourad, Staines-Upon-Thames (GB)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/422,376

(22) PCT Filed: Jan. 17, 2020

(86) PCT No.: PCT/US2020/014115
§ 371 (c)(1),
(2) Date: Jul. 12, 2021

(87) PCT Pub. No.: WO2020/150620
PCT Pub. Date: Jul. 23, 2020

(65) Prior Publication Data
US 2022/0131829 A1    Apr. 28, 2022

Related U.S. Application Data

(60) Provisional application No. 62/794,148, filed on Jan. 18, 2019.

(51) Int. Cl.
*H04L 61/5014* (2022.01)
*H04L 61/5038* (2022.01)
(Continued)

(52) U.S. Cl.
CPC ...... *H04L 61/5014* (2022.05); *H04L 61/5038* (2022.05); *H04L 2101/622* (2022.05); *H04L 2101/659* (2022.05)

(58) Field of Classification Search
CPC ............ H04L 61/5014; H04L 61/5038; H04L 2101/622; H04L 2101/659
See application file for complete search history.

(56) References Cited

U.S. PATENT DOCUMENTS

| 8,804,682 B2 * | 8/2014 | Hirano ................ H04W 36/385 370/338 |
| 10,771,438 B2 | 9/2020 | Zuniga et al. |

(Continued)

FOREIGN PATENT DOCUMENTS

| CN | 101179511 A | 5/2008 |
| WO | 01/49003 A2 | 7/2001 |
| WO | WO-2018058620 A1 * | 4/2018 ......... H04L 12/4633 |

OTHER PUBLICATIONS

Glenn Parsons, Local MAC Addresses in the Overview and Architecture based on IEEE Std 802c, Nov. 6, 2017, URL retrieved via: https://mentor.ieee.org/802-ec/dcn/17/ec-17-0174-00-00EC-IEEE-802-tutorial-of-2017-11-06-local-mac-addresses-in-the-overview-and-architecture-based-on-IEEE-std-802c.pdf (Year: 2017).*

(Continued)

*Primary Examiner* — Schquita D Goodwin
(74) *Attorney, Agent, or Firm* — Volpe Koenig

(57) ABSTRACT

A method performed by a WTRU may comprise receiving context information from infrastructure equipment and selecting a SLAP quadrant for MAC address allocation. The selecting may be based on the context information received from the infrastructure equipment, which may be a bootstrapping server for the WTRU. The method may further comprise transmitting, to a DHCP server, a DHCP message indicating the selected SLAP quadrant. In response to the (Continued)

transmitted DHCP message, a MAC address may be received and configured to the WTRU. Context information includes, but is not limited to, a number of nodes in a network, a type of network deployment, a type of network, a mobility configuration, a type of device management, a battery lifetime, a location or privacy configuration.

20 Claims, 10 Drawing Sheets

(51) Int. Cl.
*H04L 101/622* (2022.01)
*H04L 101/659* (2022.01)

(56) References Cited

U.S. PATENT DOCUMENTS

| | | | |
|---|---|---|---|
| 2008/0089323 | A1 | 4/2008 | Elias et al. |
| 2009/0019164 | A1* | 1/2009 | Brown ............... H04L 67/1021 709/227 |
| 2012/0023207 | A1 | 1/2012 | Gandhewar et al. |
| 2013/0097674 | A1 | 4/2013 | Jindal et al. |
| 2015/0113168 | A1 | 4/2015 | Xu |
| 2016/0330165 | A1 | 11/2016 | Jeanne et al. |
| 2017/0171737 | A1 | 6/2017 | Mestanov et al. |
| 2018/0077111 | A1 | 3/2018 | Pang |
| 2018/0145834 | A1* | 5/2018 | Dharankar ............ H04W 12/10 |
| 2018/0324138 | A1* | 11/2018 | Das .................. H04W 36/0055 |
| 2019/0387459 | A1* | 12/2019 | McCann .............. H04W 8/265 |
| 2019/0394816 | A1* | 12/2019 | Kim ..................... H04W 76/10 |

OTHER PUBLICATIONS

IEEE Computer Society, IEEE Standard for Local and Metropolitan Area Networks: Overview and Architecture Amendment 2: Local Medium Access Control (MAC) Address Usage, Aug. 25, 2017, URL retrieved via: https://ieeexplore.IEEE.org/document/8016709 (Year: 2017).*
Bernardos et al., "SLAP quadrant selection options for DHCPv6," draft-ietf-dhc-slap-quadrant-01, DHC WG, Internet-Draft (Jul. 8, 2019).
Bernardos et al., "SLAP quadrant selection options for DHCPv6," draft-ietf-dhc-slap-quadrant-02, DHC WG, Internet-Draft (Jan. 13, 2020).
De la Oliva et al., Proposal for IEEE 802.1CQ (Self-Assignment part), pp. 1-10 (2018).
Draft Standard for Local and Metropolitan Area Networks: Multicast and Local Address Assignment, IEEE P802.1CQ/D0.1 (Feb. 2016).
Edney et al., "Temporary MAC Addresses for Anonymity," IEEE 802.11-02/109r0 (Jan. 2002).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Local and Metropolitan Area Networks: Overview and Architecture; Amendment 2: Local Medium Access Control (MAC) Address Usage, IEEE Std 802c-2017(Jun. 15, 2017).
IEEE Standards Association, Guidelines for Use of Extended Unique Identifier (EUI), Organizationally Unique Identifier (OUI), and Company ID (CID), pp. 1-19 (Aug. 3, 2017).
McCann, "MAC address policy ANQP-element," IEEE 802.11-19/0134r1 (Jan. 15, 2019).
Mrugalski et al., "Dynamic Host Configuration Protocol for IPv6 (DHCPv6) bis," Dynamic Host Configuration (DHC), Internet-Draft (Mar. 4, 2018).
Volz et al., "Link-Layer Addresses Assignment Mechanism for DHCPv6," draft-bvtm-dhc-mac-assign-01, Dynamic Host Configuration (DHC), Internet-Draft (May 14, 2018).
Volz et al., "Link-Layer Addresses Assignment Mechanism for DHCPv6," draft-ietf-dhc-mac-assign-00, Dynamic Host Configuration (DHC), Internet-Draft (Apr. 17, 2019).
Volz et al., "Link-Layer Addresses Assignment Mechanism for DHCPv6," draft-bvtm-dhc-mac-assign-02, Dynamic Host Configuration (DHC), Internet-Draft (Oct. 20, 2018).
Lin et al., "Access Control in New Network Environment," Journal of Software, vol. 18, No. 4, pp. 955-966 (Apr. 2007).

* cited by examiner

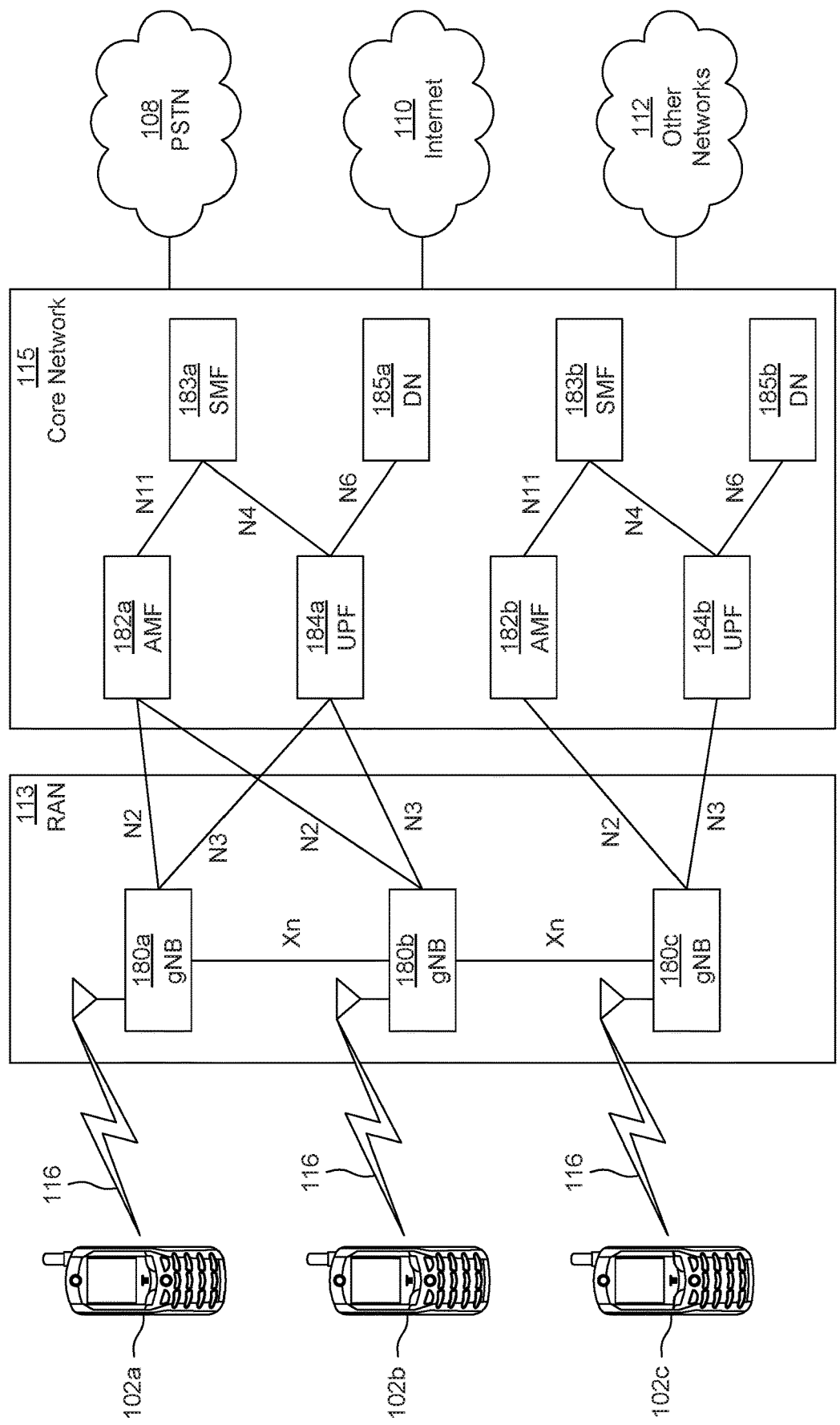

METHODS FOR SPECIFYING THE TYPE OF MAC ADDRESS WITH DYNAMIC ASSIGNMENT MECHANISMS

CROSS REFERENCE TO RELATED APPLICATIONS

This application is the U.S. National Stage, under 35 U.S.C. § 371, of International Application No. PCT/US2020/014115, filed Jan. 17, 2020, which claims the benefit of U.S. Provisional Application Ser. No. 62/794,148, filed Jan. 18, 2019, the contents of which is hereby incorporated by reference herein.

SUMMARY

A method performed by a wireless transmit/receive unit (WTRU) may comprise receiving context information from infrastructure equipment and selecting a structured local address plan (SLAP) quadrant for media access control (MAC) address allocation. The selecting may be based on the context information received from the infrastructure equipment, which may be a bootstrapping server for the WTRU. The method may further comprise transmitting, to a dynamic host control protocol (DHCP) server, a DHCP message indicating the selected SLAP quadrant. In response to the transmitted DHCP message, a MAC address may be received and configured to the WTRU. Context information includes, but is not limited to, a number of nodes in a network, a type of network deployment, a type of network, a mobility configuration, a type of device management, a battery lifetime, a location or privacy configuration.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1D is a system diagram illustrating a further example RAN and a further example CN that may be used within the communications system illustrated in FIG. 1A according to an embodiment;

DETAILED DESCRIPTION

Figure 1A:
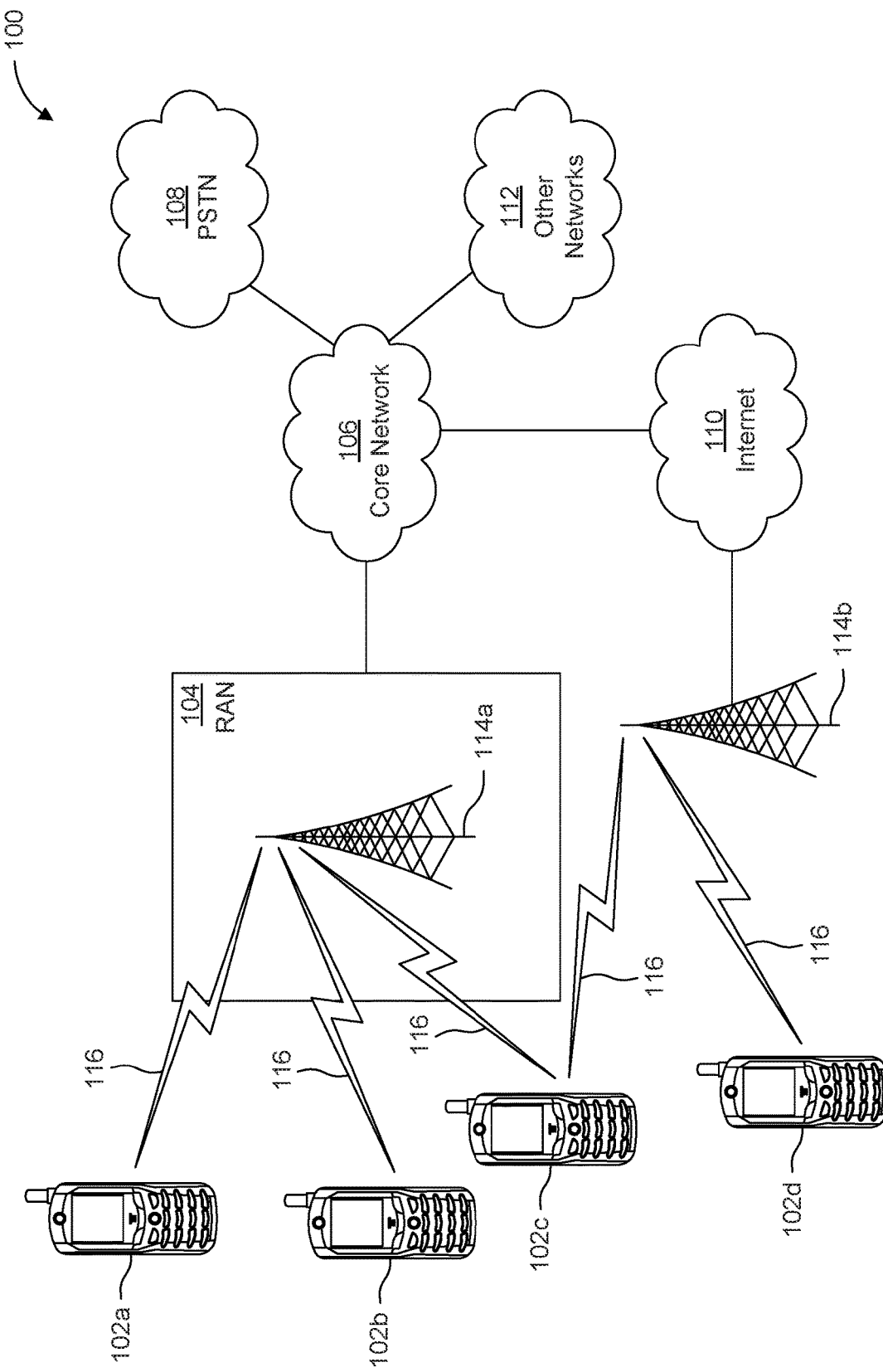
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
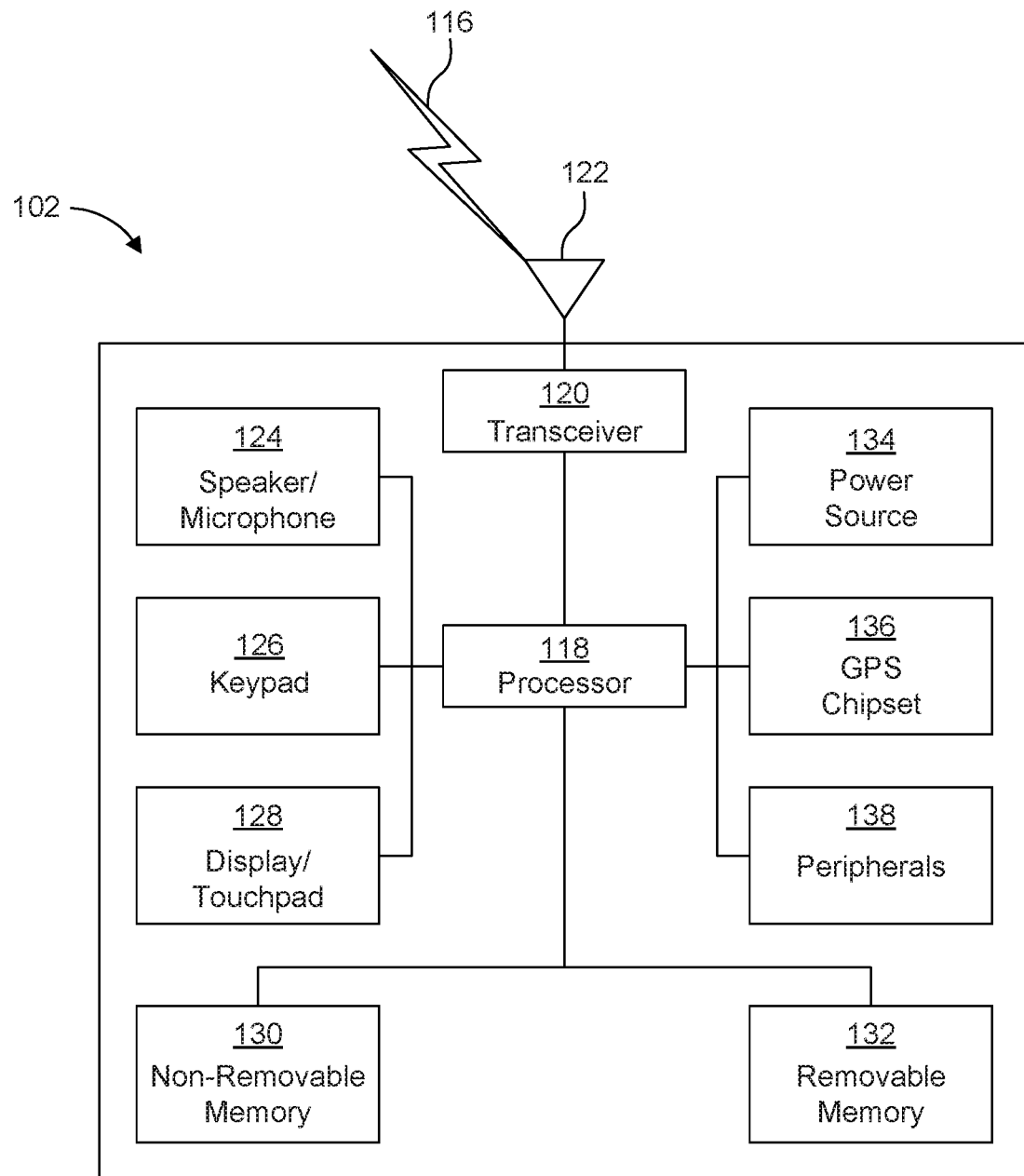
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
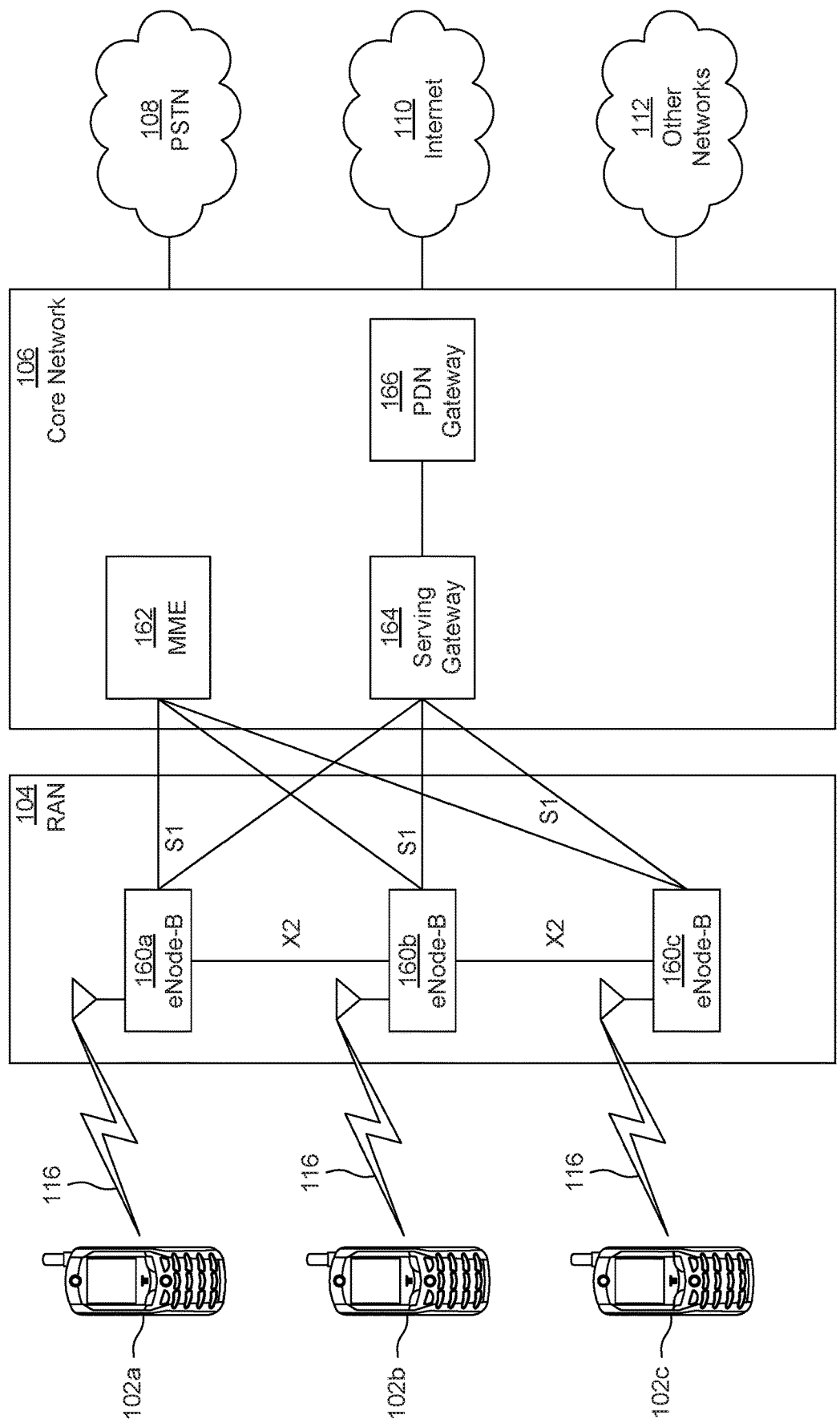
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The IEEE originally structured a 48-bit MAC address space in such a way that half of the address space is reserved for local use. When the universal/local (U/L) bit is set to 1, local use is configured. Different assignment approaches may be used within four specified regions of this local MAC address space according to an optional structured local access plan (SLAP). These four regions, called SLAP quadrants, include an extended local identifier (ELI) quadrant; a standard assigned identifier (SAI) quadrant; an administratively assigned identifier (AAI) quadrant; and a quadrant reserved for future use.

Quadrant ELI MAC addresses may be assigned based on a Company ID (CID), which takes 24-bits, leaving the remaining 24-bits for the locally assigned address for each CID for unicast (M-bit=0) and also for multicast (M-bit=1). The CID is assigned by the IEEE Registration Authority (RA).

Quadrant SAI MAC addresses are assigned based on a protocol specified in an IEEE 802 standard. For 48-bit MAC addresses, 44 bits are available. Multiple protocols for assigning SAIs may be specified in IEEE standards. Coexistence of multiple protocols may be supported by limiting the subspace available for assignment by each protocol.

Quadrant AAI MAC addresses are assigned locally by an administrator. Multicast IPv6 packets use a destination address starting in 33:33 and since this falls within this space, therefore conflicting address should not be used to avoid conflict with IPv6 multicast addresses. For 48-bit MAC addresses, 44 bits are available.

A reserved for future use quadrant defines a region where MAC addresses may be assigned using new methods yet to be defined, or by an administrator, for example, similar to assignments made in the AAI quadrant.

Figures 2A, 2B:
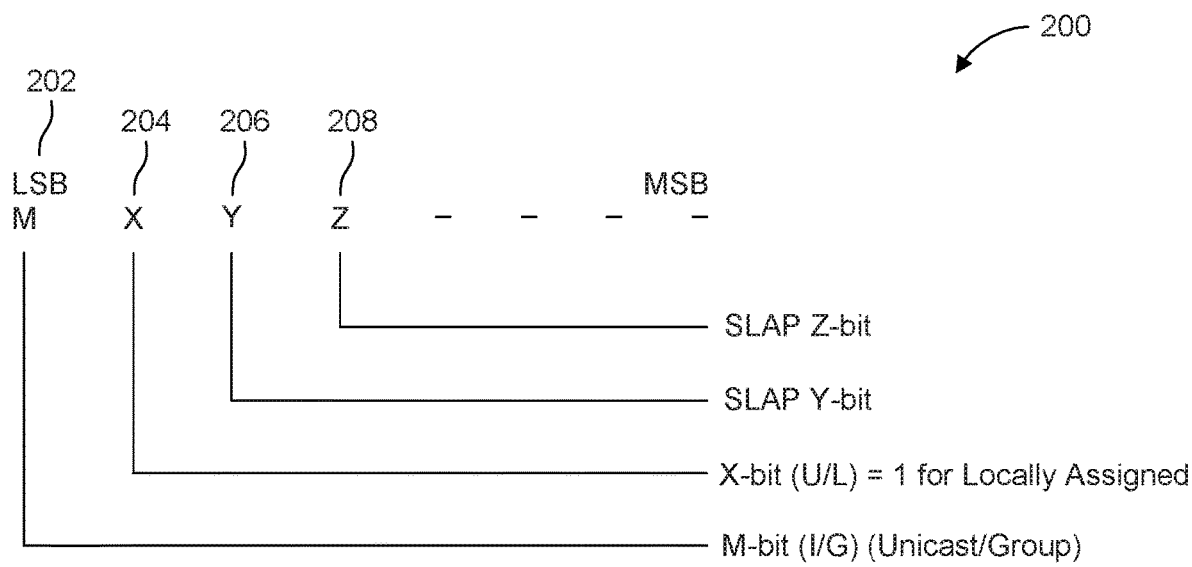
FIG. 2A is an example structure illustrating four least significant bits of a 48 bit-MAC address.
FIG. 2B is a table outlining features of four SLAP quadrants identified using a Y-bit and Z-bit.

FIG. 2A is an example structure 200 of an IEEE 48 bit-MAC address structure. In this example, four least significant bits (LSBs) are identified. LSB M 202 refers to an M-bit individual/group (I/G) indicator indicating whether the MAC address is an address for a unicast WTRU or group of WTRUs. LSB X-bit 204 indicates whether or not a MAC address is locally assigned. LSB Y 206 refers to a SLAP Y-bit and LSB Z 208 refers to the SLAP Z-bit. A SLAP Y-bit and X-bit are detailed in the table 220 shown in FIG. 2B.

FIG. 2B is a table 220 outlining features of four SLAP quadrants. Table 220 is organized in terms of quadrant 222, Y-bit 224, Z-bit 226, local identifier type 228 and local identifier 230. For quadrant 01 232, when the Y-bit is set to 0 240 and the z-bit is set to 1 248, the local identifier type is extended local 256 and local identifier is ELI 264. For quadrant 11 234, when the Y-bit is set to 1 242 and the Z-bit is set to 1 250, the local identifier type is standard assigned 258 and local identifier is SAI 266. For quadrant 00 236, when the Y-bit is set to 0 244, Z-bit is set to 0 252, the local identifier type is administratively assigned 260 and local identifier is AAI 268. For quadrant 10 238, when the Y-bit is set to 1 246 and the Z-bit is set to 0 254, the local identifier type is reserved 262 and local identifier is also reserved 270.

The IEEE is working on mechanisms to allocate addresses in the Standard Assigned Identifier (SAI) quadrant, and in conjunction, the Internet Engineering Task Force (IETF) is working on specifying new mechanisms that extend Dynamic Host Control Protocol version 6 (DHCPv6) operation to handle local MAC address assignments. In this way, MAC assignments may be handled on a dynamic basis. However, these standardization efforts do not provide a mechanism that supports methods for choosing a SLAP quadrant for use in an allocation of a MAC address to a requesting WTRU, which may be a terminal or client unit. In embodiments, DHCPv6 protocols have been extended to enable a DHCPv6 client or a DHCPv6 relay to indicate a preferred SLAP quadrant to a server, so that the server may correspondingly allocate the MAC address to the given client or relay. Two example applications are described in which a need arises to assign local MAC addresses according to preferred SLAP quadrants: (1) individual WTRUs and (2) large-scale virtualized environments, for example, data centers, in which many virtual machines are managed by hypervisors or by other virtualization technologies.

As to the first application, most WTRUs deployed today come with pre-installed interfaces that have a "burned" in MAC address, allocated from the universal address space using a 24-bit Organizationally Unique Identifier (OUI), assigned to IEEE 802 interface vendors. Recently, however, the need to assign local (instead of universal) MAC addresses to WTRUs has emerged in particular Internet of Things (IoT) systems and privacy.

An IoT system may incorporate many cheap, sometimes short-lived and disposable devices. For these devices, reuse of MAC address would be ideal so as to not extend the MAC address space more than necessary. Examples of these devices may include: sensors and actuators for health or home automation applications. In these systems, it is common that upon a first boot, an IoT device uses a temporary MAC address to send initial DHCP packets to available DHCP servers. IoT devices typically request a single MAC address for each available network interface, for example, wired and wireless interfaces. Once a server assigns a MAC address, the device abandons its temporary MAC address used for sending the initial DHCP packets. This type of device is typically not a moving or highly mobile device. In general, any type of SLAP quadrant would be good for assigning addresses, but ELI/SAI quadrants may be more suitable in some scenarios, such as if it is necessary that the assigned addresses belong to a Company ID (CID) assigned to the IoT communication device vendor.

Regarding the privacy concerns of WTRUs, an exposure of a MAC address allows for the exposure of users' locations, thus making it relatively easy to track users' movement. One of the mechanisms considered to mitigate this problem is the use of local random MAC addresses, which change every time the user connects to a different network. In this scenario, devices are typically mobile. Here, an AAI quadrant may be the best SLAP quadrant to assign addresses from, as it is the best fit for randomization of addresses and it is not required for the addresses to survive when changing networks.

Figure 3A:
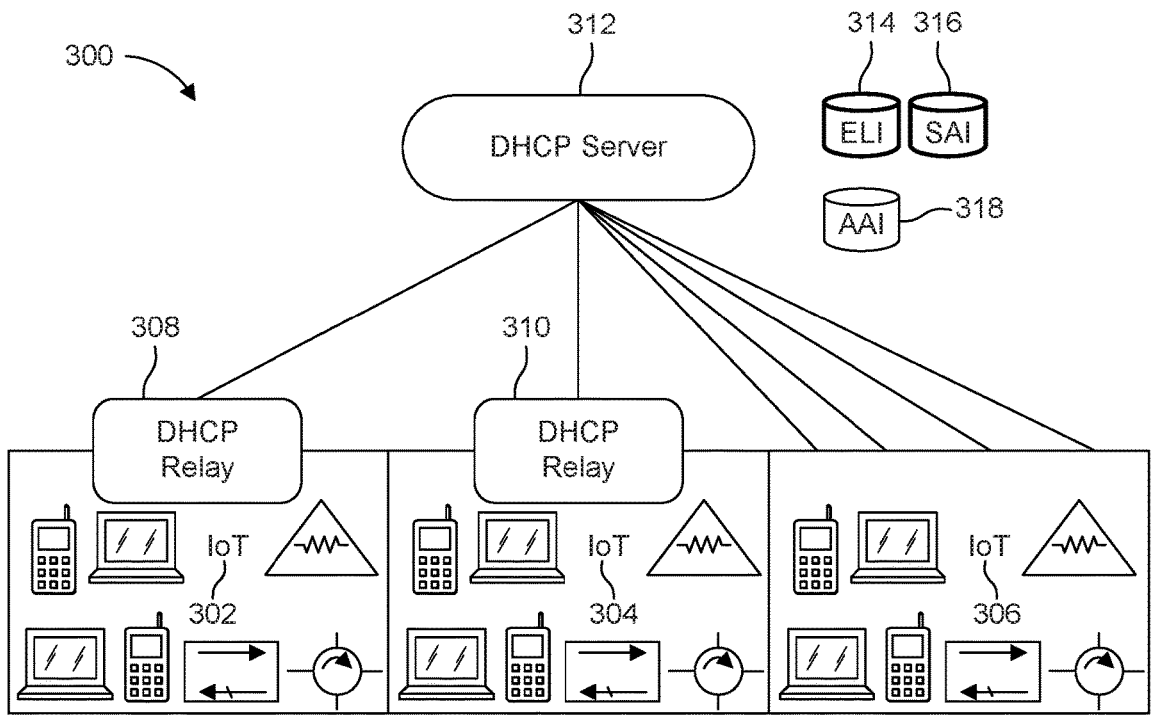
FIG. 3A is a depiction of several Internet of Things (IoT) networks interfacing with a dynamic host configuration protocol (DHCP) architecture.

FIG. 3A is a depiction 300 of several Internet of Things (IoT) networks 302-306 interfacing with a dynamic host configuration protocol (DHCP) architecture. Each of IoT networks 302-306 may comprise one or more IoT devices including WTRUs, home appliances, door locks, bicycles, fitness sensors and the like. IoT Networks 302-304 include DHCP relays 308, 310 for coupling to a DHCP server 312. IoT network 306 may not include a DHCP relay and IoT devices of IoT network 306 may directly reach out to DHCP server 312. A single ELI 314, SAI 316 and AAI 318 may be used in this example.

As to the second application, virtualization may encourage assignment of local MAC addresses. For example, in large scale virtualization environments, thousands of virtual machines (VMs) are active. These VMs are typically managed by a hypervisor, in charge of spawning and stopping VMs as needed. The hypervisor is also typically in charge of assigning new MAC addresses to the VMs. If a DHCP solution is in place for that, the hypervisor acts as a DHCP client and requests available DHCP servers to assign one or more MAC addresses of an address block. The hypervisor does not use those addresses for itself, but rather uses them to create new VMs with appropriate MAC addresses. Each VM may be provided with a new MAC address upon being instantiated. For very large data center environments, a division of different network regions is typical. Each one of the different network regions is configured to manage its own local address space. In this scenario, shown in FIG. 3B, there are two elements which include: migratable functions and non-migratable functions.

Figure 3B:
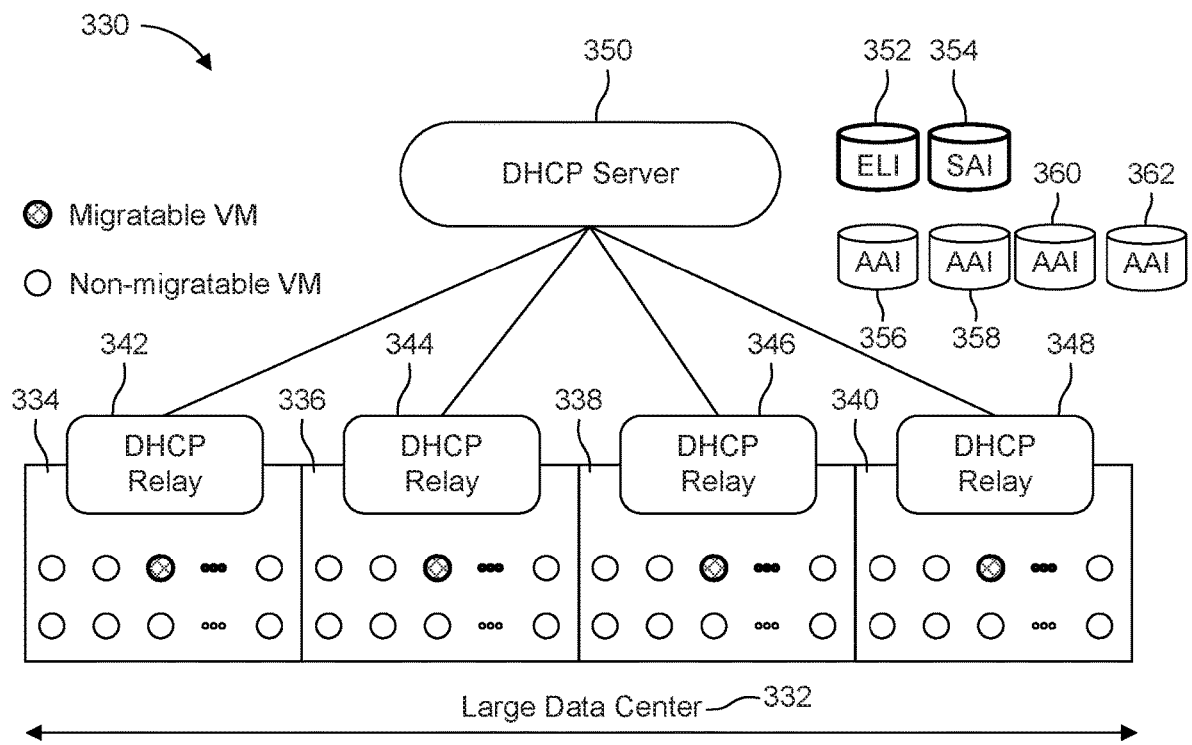
FIG. 3B is a depiction of a large scale data center interfacing with a DHCP architecture.

FIG. 3B is a depiction 330 of a large scale data center 332 interfacing with a DHCP architecture. A large data center 332 may be composed of a plurality of regions 334-340. Each one of the regions may comprise migratable VMs and non-migratable VMs. Each region 334-340 may include a DHCP relay 342-348 for relaying DHCP messages to and from a DHCP server 350. A single ELI quadrant 352 and SAI quadrant 354 may be used. Alternatively, each region may assign address from an AAI quadrant 356-362.

If a VM, which provides a given function, needs to be potentially migrated to another region of the data center, due to maintenance, resilience, end-user mobility, etc., it may be a requirement that this VM keep its networking context in the new region, and this includes keeping its MAC address(es). Therefore, to satisfy this need, it may be appropriate to allocate addresses from an ELI/SAI SLAP quadrant, which may be centrally allocated by the DHCP server.

On the other hand, if it is known that a VM will likely not be migrated to another region of the data center, then there may be no requirements associated with its MAC address. In this scenario, it is more efficient to allocate a MAC address from the AAI SLAP quadrant, which does not need to be the same for all the data centers. In an embodiment, each region may manage its own MAC addresses, without checking for duplicates globally.

Mechanisms for SLAP quadrant selection, from terminals, to decide which MAC address to use and when to change an assigned MAC address may be determined based on context information and/or a preference indicated by the terminals, for example, a WTRU, or the infrastructure, for example, a base station or cellular core network server. As described herein, these mechanisms may be implemented, for example, within each of the above described applications, including IoT applications, privacy sensitive implementation applications and data center applications.

In an IoT architecture, IoT terminals may attach to a WLAN network using a burned-in temporary MAC address. This allows the terminals to obtain connectivity and properly bootstrap. During this phase, the terminal may obtain information and/or preferences to aid its decision of which SLAP quadrant to use to configure a local MAC address which is more permanent than the temporary burned-in address. As is shown in FIG. 4, the IoT device may make a standalone decision or an infrastructure-aided decision as to which SLAP quadrant to use to obtain a local MAC address.

Figure 4:
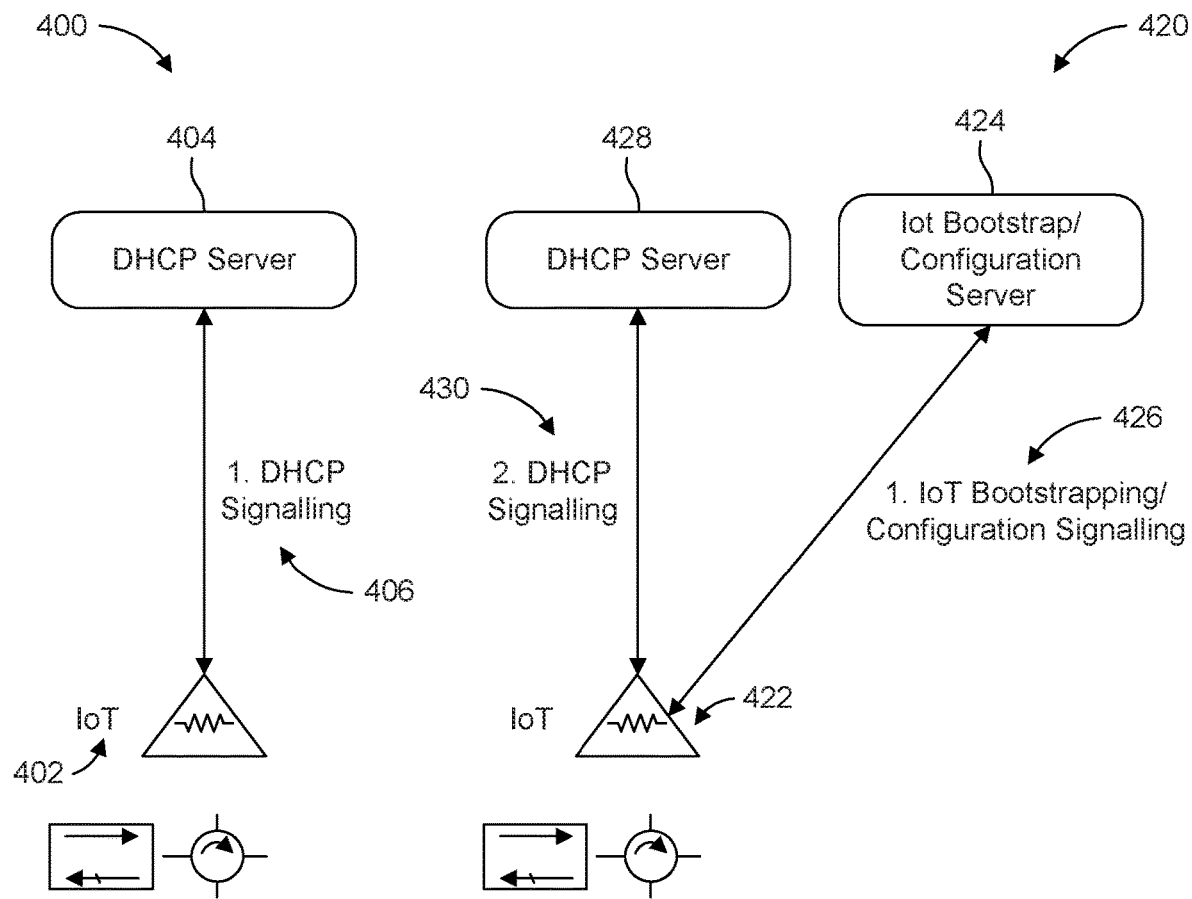
FIG. 4 is a diagram showing signaling for IoT quadrant selection in both standalone decision and infrastructure-aided decision modes.

FIG. 4 is a diagram showing signaling for IoT quadrant selection in both standalone decision 400 and infrastructure-aided decision 420 modes. In making a standalone decision 400, the IoT device 402 may rely on context information including, but not limited to: the type of IoT deployment, for example, industrial, domestic, rural, etc.; mobility; whether the devices is managed or unmanaged; and/or operation/battery lifetime. For small deployments, such as domestic ones, the IoT device 402 itself may decide to use the AAI quadrant. This decision may not involve the use of DHCP, in an embodiment, by the terminal configuring a random address computed by the terminal itself. Otherwise, DHCP signaling 406 may be used. For large deployments, such as industrial or rural deployments, where thousands of terminals might co-exist, the IoT device 402 may decide to use the ELI or SAI quadrants. If the IoT device 402 can or may move, then it might prefer to select the SAI or AAI quadrants to minimize address collisions when moving to another network. If the IoT device 402 is known to remain fixed, then the ELI quadrant may be the most suitable one to use. Depending on whether the IoT device 402 is managed during its lifetime or cannot be re-configured, the selected quadrant might be different. For example, it can be managed, this means that network topology changes might occur during its lifetime, for example, due to changes on the deployment, such as extensions involving additional terminals, and this might have an impact on the preferred quadrant, for example, to avoid potential collisions in the future. Depending on an expected lifetime of the terminal, a different quadrant might be preferred to minimize potential address collisions in the future. These are examples of parameters that an IoT terminal may use to select a given SLAP quadrant. Other parameters may also be relied on. IoT terminals are typically resource constrained, so simple decisions may be taken, for example, based on pre-configured preferences or pre-configured settings.

For the IoT scenario, it is further expected that in most of the cases the selected quadrant would be ELI. In this case, the MAC address to be provided to the terminal is based on a Company ID (CID) and this CID is typically pre-configured in the terminal as burned temporary address. However, in large IoT deployments, such as rural or industrial ones, the address space from a single CID might deplete. In this case, the terminal can provide a list of preferred CIDs to be used by the DHCP server 404 to provide MAC addresses from. The additional CIDs might belong to other vendors that the IoT terminal manufacturer have business relationships or agreements, for example, subsidiaries of the IoT terminal vendor. When the selected quadrant by the terminal is ELI, the DHCP server 404 can allocate addresses from the primary CID, from any of the additional provided CIDs or even from a different one. In all cases, the DHCP server 404 can or may check from which CIDs the terminal can be allocated a local MAC address. This may be done for example by the DHCP server 404 having the list of authorized CIDs per IoT terminal. An exemplary procedure showing how an IoT terminal may select the quadrant and perform the local MAC address configuration is shown in FIG. 5.

In making an infrastructure-aided decision 420, the IoT terminal 422 receives from the infrastructure a hint/preference/request 426 about which SLAP quadrant it should use to obtain a local MAC address. In an IoT scenario, this hint might come signaled 426 from a bootstrapping/configuration server 424 that the IoT terminal 422 uses to complete its configuration. The server 424 might also use parameters correlated to the deployment environment/context of the IoT terminal to perform the quadrant selection including: (1) the type of IoT deployment; (2) mobility; and/or (3) operation/battery lifetime.

On the right hand side of FIG. 4, the general operation of the infrastructure aided-decision 420 is shown. The IoT terminal 422 contacts the bootstrapping/configuration server 424, which might be running on the cloud or locally where the IoT terminal 422 is deployed and, as part of the bootstrapping/configuration signaling 426, receives the selected SLAP quadrant that then is used in the DHCP signaling 430 with a DHCP server 428.

Figure 5:
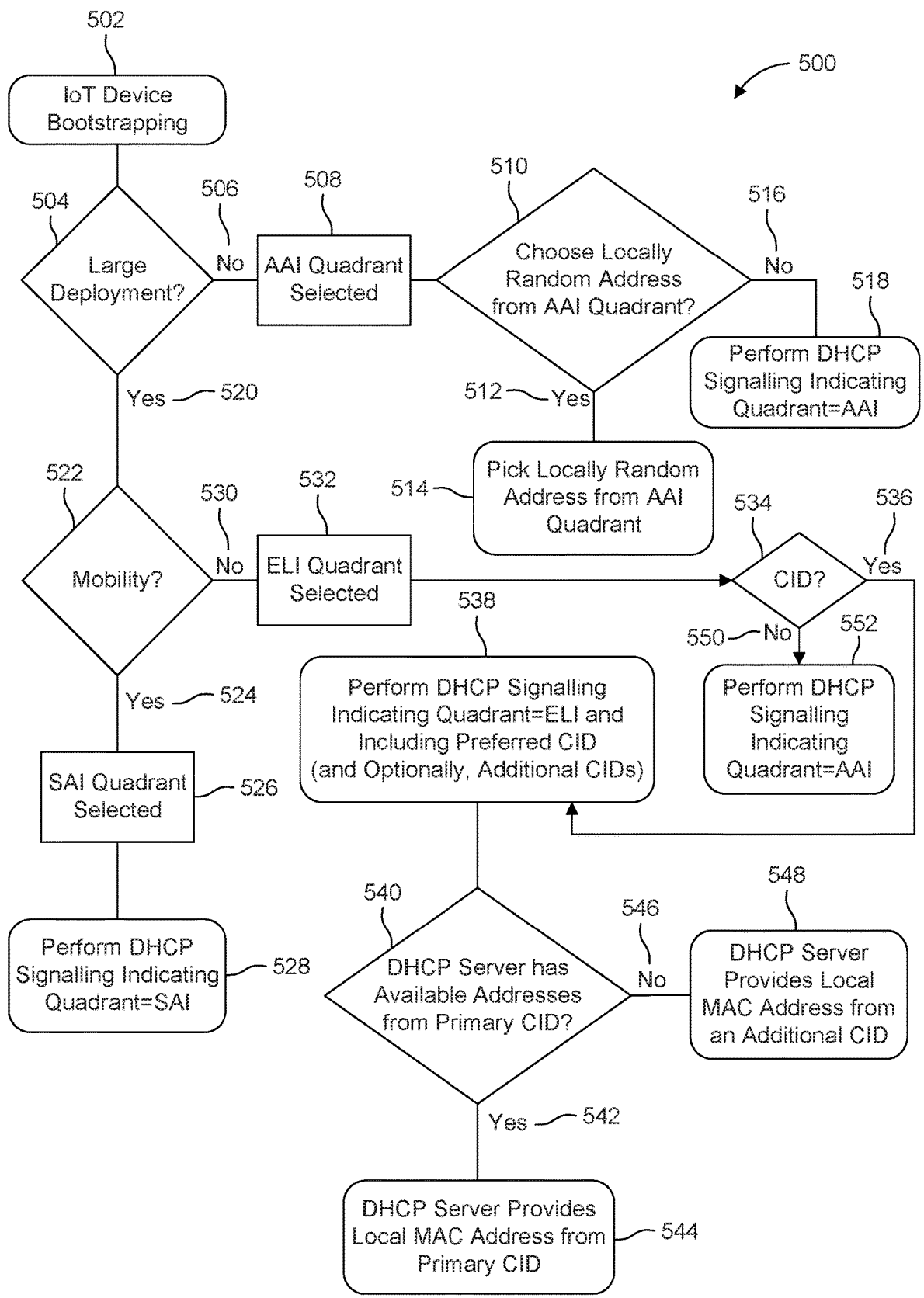
FIG. 5 is a decision flowchart for quadrant selection in an IoT terminal embodiment.

FIG. 5 is a decision flowchart 500 for quadrant selection in an IoT terminal embodiment. In an embodiment, a bootstrapping IoT device 502 may determine whether or not it is a component of a large deployment 504. If it determines that it is not 506 a component of a large deployment, the IoT terminal may select an AAI quadrant 508. The IoT device may be configured to choose 510 a random address locally from an AAI quadrant. If it is configured 512 to choose a random address locally, the IoT may pick a random address 514 from the AAI quadrant. On the contrary 516, the IoT device may perform DHCP signaling 518, with a DHCP server or other server, indicating an AAI quadrant.

If the IoT device is part of a large deployment 520, the IoT device may consider mobility 522 as a factor in performing quadrant selection. If the device is likely to be mobile 524, then the IoT device may use an SAI quadrant 526 and may perform DHCP indicating SAI 528.

If the IoT device is expected to be stationary and not mobile 530, the IoT device may select an ELI quadrant 532 and may determine if a CID 534 should be included. If the IoT device has a CID to include 536, the IoT device may perform DHCP signaling indicating ELI 538 and include a preferred CID. The IoT device may optionally include additional CIDs. If the IoT device determines 534 that no 550 CID is used, then the IoT device may perform DHCP signaling 552 indicating an AAI quadrant.

Assuming the IoT device does perform DHCP signaling 538 with at least one CID indicated, a DHCP server may determine whether addresses are available from a primary CID 540. If address are available from the primary CID 542, the DHCP server may provide 544 a local MAC address from the primary CID. If no addresses are available 546, the DHCP server may provide a local MAC address from an additional CID 548.

Privacy-enhancing solutions for assigning local MAC addresses to WTRUs may define additional procedures. In these scenarios, a WTRU, such as a laptop or smartphone, connects to a network using its built in MAC address. Due to privacy/security concerns, the terminal might want to configure a local MAC address. The terminal might use different parameters and context information to decide, not only which SLAP quadrant to use for the local MAC address configuration, but also when to perform a change of address. In some embodiments, a change of address may be performed several times over a device lifetime. Context information may include, but it is not limited to: a type of network to which the terminal is connected, for example, public, work, home or the like; whether the network is trusted; whether the terminal is visiting the network for the first time; a network geographical location; whether the terminal is mobile; an operating system (OS) network profile, including security/trust related parameters; and/or triggers provided by applications running on the device which regard to location privacy. Regarding an OS network profile, most modern OSs keep metadata associated to the networks they can or may attach to, as for example the level of trust the user or administrator assigns to the network. This information may be used to configure how a terminal behaves in terms of advertising itself on the network, firewall settings, etc. But this information can or may also be used to decide whether to configure a local MAC address or not, from which SLAP quadrant and how often to do so. As to application triggers, an application may provide a request to the OS to maximize location privacy, for example, due to the nature of the application, and this might mean the OS to force the use or change of a local MAC address.

This information may be used by the terminal to select the SLAP quadrant. For example, if the terminal is moving around (e.g., while connected to a public network in an airport), it is likely that it might change access point several times, and therefore it is best to minimize the chances of address collision, using the SAI or AAI quadrants. If the terminal is not moving and attached to a trusted network (e.g., at work), then it is probably best to select the ELI quadrant. These are just some examples of how to use this information to select the quadrant. Additionally, the information may also be used to trigger subsequent changes of MAC address, to enhance location privacy. Besides, changing the SLAP quadrant used might also be used as an additional enhancement to make harder to track the user location.

In a data center application, a hypervisor may request local MAC addresses to be assigned to virtual machines. As in other embodiments, the hypervisor might select the preferred SLAP quadrant using information provided by the cloud management system (CMS) or virtualization infrastructure manager (VIM) running on top of the hypervisor. This information might include, but is not limited to: whether or not a VM is migratable or non-migratable VM; and/or VM connectivity characteristics, for example, stand-alone, part of a pool, part of a service graph/chain. Whether the VM is migratable has an impact on the preference for the SLAP quadrant, as some quadrants are better suited (e.g., ELI/SAI) for supporting migration in a large data center. The VM connectivity characteristics, if known, may be used by the hypervisor to select the best SLAP quadrant.

Pertaining to any of the above WTRU or data center applications, various DHCPv6 extensions may be defined outlining steps to allow the selection of the SLAP quadrant of the local MAC address according to the preference of the requesting DHCPv6 client. Such steps may differ depending on whether the SLAP quadrant is indicated by the DHCP client, for example, a terminal/IoT device or by a DHCP relay.

Figure 6:
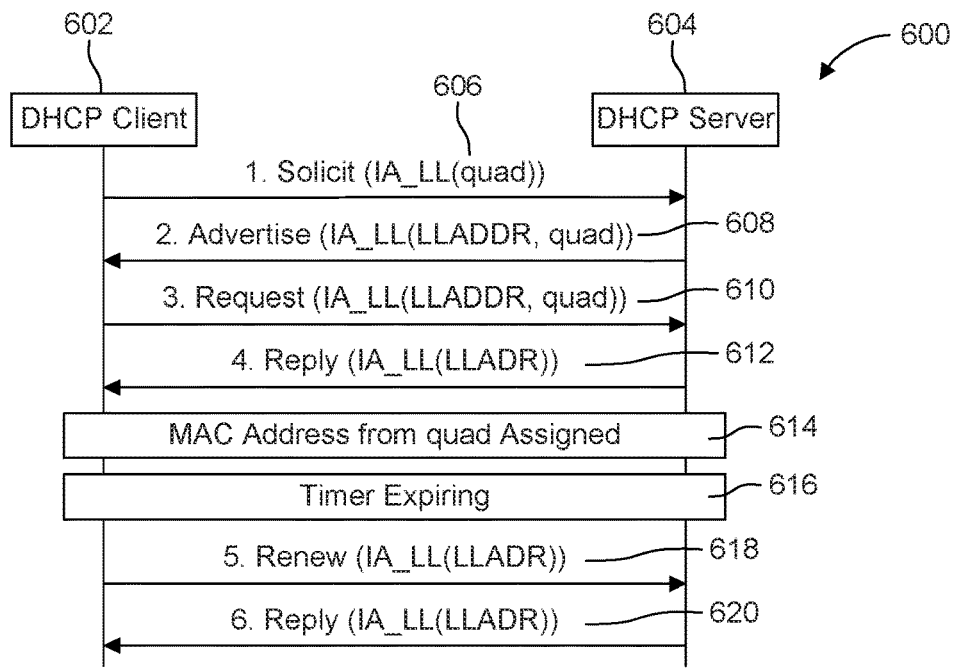
FIG. 6 is a DHCPv6 signaling flow diagram with client-server extensions.

FIG. 6 shows steps 600 defined in an example extension to permit address assignment when the preferred SLAP quadrant is indicated by a DHCP client 602. At step 1, link-layer addresses (i.e., MAC addresses) are assigned in blocks. The smallest block is a single address. To request an assignment, the DHCP client 602 sends a Solicit message 606 with a IA_LL option in the message. The IA_LL option MUST contain a LLADDR option. In order to indicate the preferred SLAP quadrant, the IA_LL option includes a new quad IA-LL-option, which contains the preferred quadrant. At step 2, the DHCP server 604, upon receiving a IA_LL option, inspects its content and may offer an address or addresses for each LLADDR option according to its policy. The DHCP server 604 sends back an Advertise message 608 with an IA_LL option containing an LLADDR option that specifies the addresses being offered. If the DHCP server 604 supports the new quad IA-LL-option, and manages a block of addresses belonging to the requested quadrant, the addresses being offered SHOULD belong to the requested quadrant. If the DHCP server 604 does not have addresses from the requested quadrant, it MUST return the IA_LL option containing a Status Code option with status set to NoQuadAvail. At step 3, the DHCP client 602 waits for available servers to send Advertise responses and picks one DHCP server 604. The DHCP client 602 then sends a Request message 610 that includes the IA_LL container option with the LLADDR option copied from the Advertise message sent by the chosen server. It includes the preferred SLAP quadrant in the new quad IA-LL-option. At step 4, upon reception of a Request message 610 with IA_LL container option, the DHCP server 604 assigns requested addresses. The DHCP server 604 MAY alter the allocation at this time. It then generates and sends a Reply message 612 back to the DHCP client 602. Upon receiving a Reply message 612, the DHCP client 602 parses 614 the IA_LL container option and may start using all provided addresses. It should be noted that a DHCP client 602 that has included a Rapid Commit option in the Solicit, may receive a Reply in response to the Solicit and skip the Advertise and Request steps above (following standard DHCPv6 procedures). At step 5, when the assigned addresses are about to expire 616, the DHCP client 602 sends a Renew message 618. At step 6, the DHCP server 604 responds with a Reply message 620, including an LLADDR option with extended lifetime.

Figure 7:
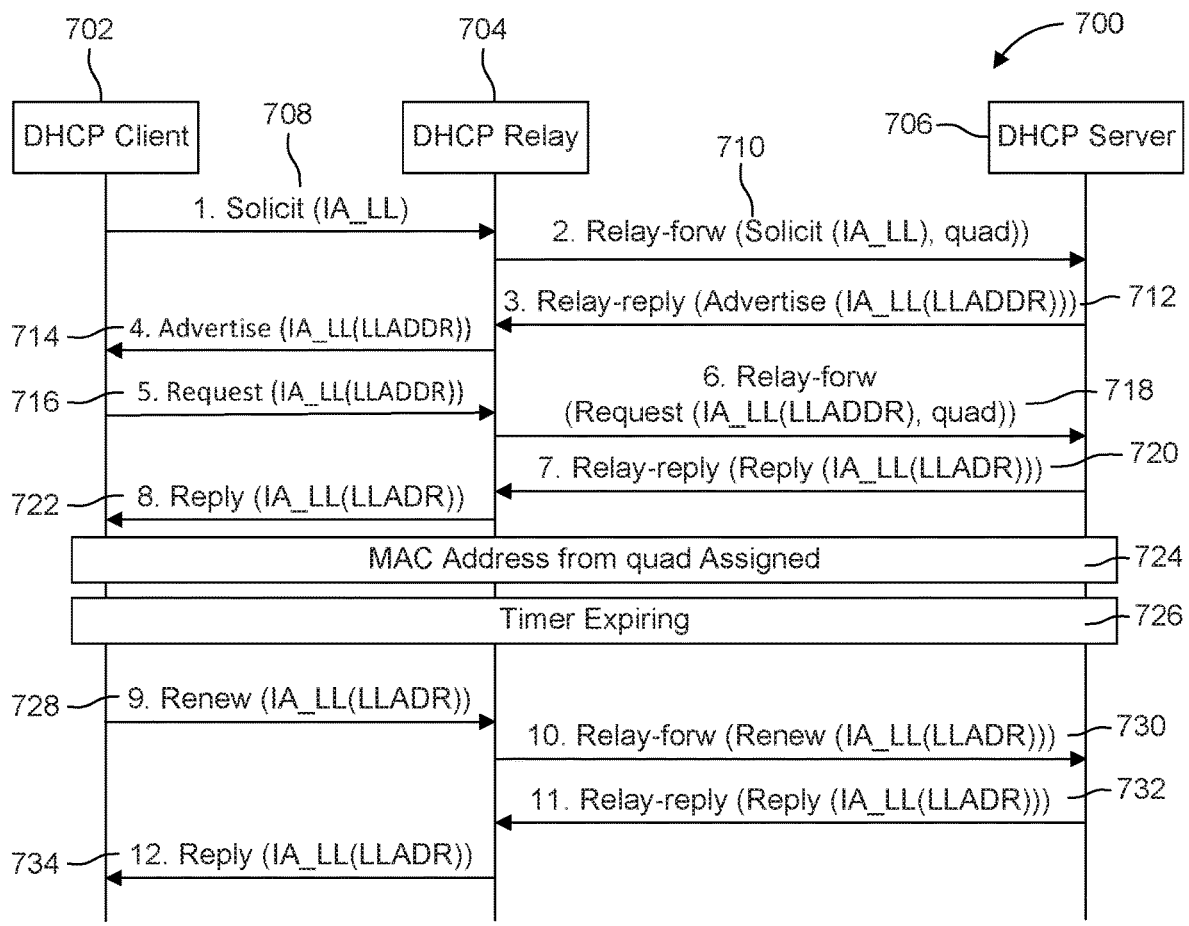
FIG. 7 is a DHCPv6 signaling flow diagram with client-relay-server extensions.

FIG. 7 shows steps 700 defined in an example extension to permit address assignment when the preferred SLAP quadrant is indicated by a DHCP relay 704. This is useful when a DHCP server 706 is operating over a large infrastructure split in different network regions, where each region might have different requirements. An example of this would be a deployment where IoT and regular WiFi-enabled end-user terminals co-exist, but split into two different WiFi networks, each one managed by a different DHCPv6 relay. At step 1, Link-layer addresses (i.e., MAC addresses) are assigned in blocks. The smallest block is a single address. To request an assignment, the DHCP client 702 sends a Solicit message 708 with a IA_LL option in the message. The IA_LL option MUST contain a LLADDR option. At step 2, the DHCP relay 704 receives the Solicit message and encapsulates it in a Relay-forty message 710. The DHCP relay 704, based on local knowledge and policies, includes in the Relay Agent Remote-ID Option the preferred quadrant. The DHCP relay 704 might know which quadrant to request based on local configuration (e.g., the served network contains IoT devices only, thus requiring ELI/SAI) or other means such as based on analyzing the Solicit message from the client. At step 3, the DHCP server 706, upon receiving the forwarded Solicit message including a IA_LL option, inspects its content and may offer an address or addresses for each LLADDR option according to its policy. The DHCP server 706 sends back an Advertise message with an IA_LL option containing an LLADDR option that specifies the addresses being offered. This message is sent to the DHCP relay 704 in a Relay-reply message 712. If the DHCP server 706 supports the semantics of the preferred quadrant included in the Relay Agent Remote-ID Option, and manages a block of addresses belonging to the requested quadrant, then the addresses being offered SHOULD belong to the requested quadrant. At step 4, the DHCP relay 704 sends the received Advertise message 714 to the DHCP client 702. At step 5, the DHCP client 702 waits for available servers to send Advertise responses and picks one server. The DHCP client 702 then sends a Request message 716 that includes the IA_LL container option with the LLADDR option copied from the Advertise message sent by the chosen server. At step 6, the DHCP relay 704 forwards the received Request in a Relay-forw message 718. It adds the Relay Agent Remote-ID Option with the preferred quadrant. At step 7, upon reception of the forwarded Request message with IA_LL container option, the DHCP server 706 assigns requested addresses. The DHCP server 706 MAY alter the allocation at this time. It then generates and sends a Reply message, in a Relay-reply 720 back to the relay. At step 8, upon receiving a Reply message 722, the DHCP client 702 parses the IA_LL container option and may start using all provided addresses. At step 9, when the assigned addresses 724 are about to expire 726, the DHCP client 702 sends a Renew message 728. At step 10, this message is forwarded by the DHCP relay 704 in a Relay-forty message 730. At step 11, the DHCP server 706 responds with a Reply message, including an LLADDR option with extended lifetime. This message is sent in a Relay-Reply message 732. At step 12, the DHCP relay 704 sends the Reply message 734 back to the DHCP client 702.

Further disclosed herein are various new DHCPv6 options and values used to indicate one or more preferred quadrants.

Figure 8:
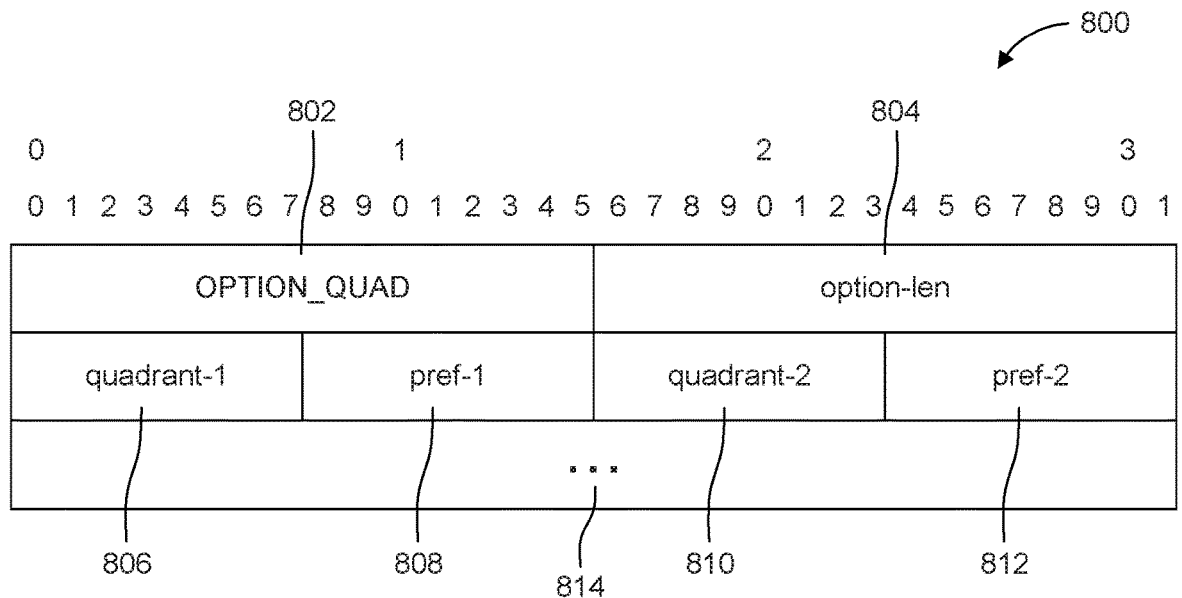
FIG. 8 is a depiction of a Quad (IA-LL) option format.

FIG. 8 provides an example format of the Quad (IA-LL) option 800 along with a description of example fields. As discussed with reference to FIG. 4, the Quad (IA-LL) option may be used to specify the preferences for the selected quadrants within an IA_LL. The option may be encapsulated in the IA_LL-options field of an IA_LL option. In the example, shown a 16 bit OPTION_QUAD field 802 may be set to a value to be assigned by the Internet Assigned Numbers Authority (IANA). A 16 bit option-length field 804 may represent a number of quadrant(s) and preference(s) included in the Quad (IA-LL) option 800. Fields quadrant-1 806 and pref-1 808 may refer to a quadrant identifier and preference. A second quadrant and preference may be indicated with quadrant-2 810 and pref-2 812 fields. 32 bits 814 may be reserved for future use or may be used to indicate additional quadrant(s) and/or preference(s). In an embodiment, quadrants may be listed in an order of preference and thus a preference may not need to be expressly indicated.

Figure 9:
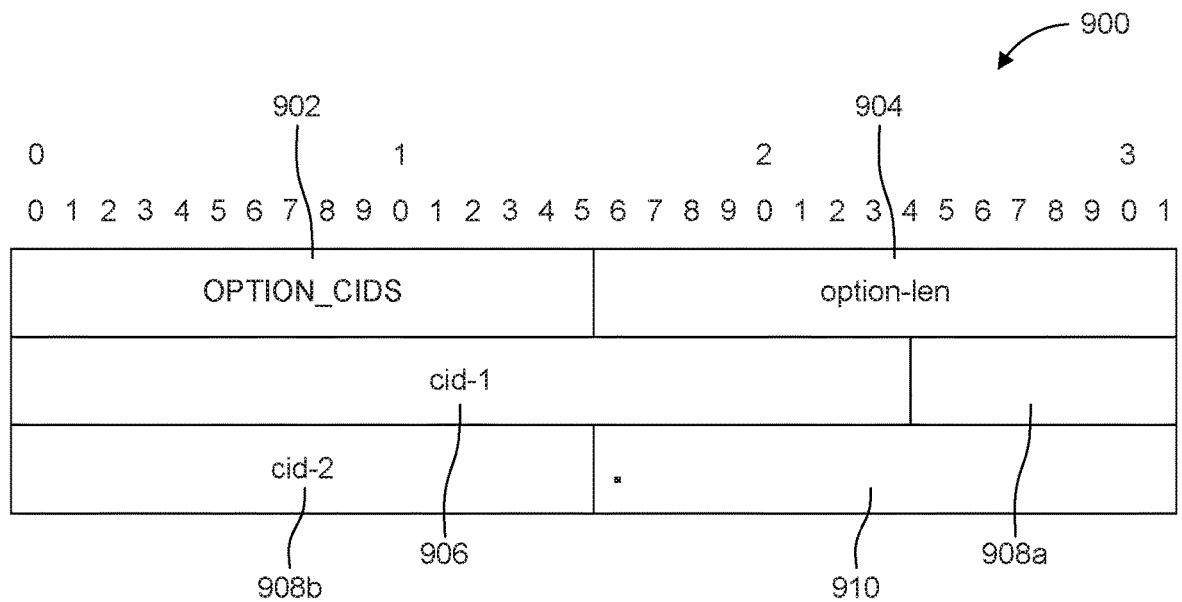
FIG. 9 is a depiction of an Additional CIDs (IA-LL) option format.

FIG. 9 provides an example format for the Additional CIDs (IA-LL) option 900 along with descriptions of the included fields. An Additional CIDs option 900 may be used to transport additional CIDs in addition to the one used as the source address of the message (i.e., the burned temporary one) within an IA_LL. This option should be used when ELI is included as one of the preferred SLAP quadrants in the Quad IA_LL option.

The Additional CIDs (IA-LL) option 900 includes a 16 bit OPTIONS_CIDS field 902 which may be a value assigned by IANA. An option-len field 904 may be used to indicate a number of CIDs which are included in the Additional CIDs (IA-LL) option 900. In the example shown, there are three CIDs included, cid-1 906, cid-2 908 a-908 b and cid-3 910.

The Relay Agent Remote-ID Option may also be used to include the quadrant in DHCPv6 signaling. The definition of the values used in the Relay Agent Remote-ID option are vendor specific. The vendor is indicated in the enterprise-number field of the option. The remote-id field may be used to encode the preferred SLAP quadrant.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a client device, the method comprising:
    selecting a structured local address plan (SLAP) quadrant;
    transmitting message indicating the SLAP quadrant; and
    receiving a second message including a media access control (MAC) address of the SLAP quadrant.

2. The method of claim 1, wherein the SLAP quadrant is selected based on context information which includes: a number of nodes in a network, a type of network deployment, a type of network, a mobility configuration, a type of device management, a battery lifetime, a location or a privacy configuration.

3. The method of claim 2, wherein the context information is received by the client from a bootstrapping server.

4. The method of claim 1, wherein the SLAP quadrant is an extended local identifier (ELI) quadrant.

5. The method of claim 1, wherein the SLAP quadrant is a standard assigned identifier (SAI) quadrant.

6. The method of claim 1, wherein the SLAP quadrant is an administratively assigned identifier (AAI) quadrant.

7. A client device comprising:
    circuitry configured to select a structured local address plan (SLAP) quadrant;
    a transmitter configured to transmit a first message indicating the SLAP quadrant; and
    a receiver configured to receive a second message, wherein the second message includes a media access control (MAC) address of the SLAP quadrant.

8. The client device of claim 7, wherein the SLAP quadrant is selected based on context information which includes: a number of nodes in a network, a type of network deployment, a type of network, a mobility configuration, a type of device management, a battery lifetime, a location or a privacy configuration.

9. The client device of claim 8, wherein the context information is received from a bootstrapping server.

10. The client device of claim 7, wherein the SLAP quadrant is an extended local identifier (ELI) quadrant.

11. The client device of claim 7, wherein the SLAP quadrant is a standard assigned identifier (SAI) quadrant.

12. The client device of claim 7, wherein the SLAP quadrant is an administratively assigned identifier (AAI) quadrant.

13. The client device of claim 7, wherein the first message is a dynamic host control protocol (DHCP) message.

14. The client device of claim 13, wherein content of the DHCP message passes through one or more DHCP version 6 (DHCPv6) relays.

15. A client device comprising:
a transceiver configured to:
to transmit a first message to a dynamic host control protocol (DHCP) server, wherein the first message indicates a structured local address plan (SLAP) quadrant;
to receive a second message from the DHCP server, wherein the second message indicates a media access control (MAC) address of the SLAP quadrant.

16. The method of claim 1, wherein the first message and the second message are a dynamic host control protocol (DHCP) messages.

17. The method of claim 16, wherein the first message is transmitted to a DHCP server and the second message is received from the DHCP server.

18. The method of claim 16, wherein content of the first message passes through one or more DHCP version 6 (DHCPv6) relays.

19. The client device of claim 15, wherein the transmitter is further configured to transmit a third message to the DHCP server, wherein the third messages requests MAC address renewal.

20. The client device of claim 19, wherein the third message includes the SLAP quadrant and the MAC address.

* * * * *

UNITED STATES PATENT AND TRADEMARK OFFICE
CERTIFICATE OF CORRECTION

PATENT NO. : 11,882,092 B2
APPLICATION NO. : 17/422376
DATED : January 23, 2024
INVENTOR(S) : Carlos Jesus Bernardos and Alain Mourad It is certified that error appears in the above-identified patent and that said Letters Patent is hereby corrected as shown below:

In the Claims

In Column 20, Line 33, insert the words --a first-- between "transmitting message"

In Column 21, Line 12, remove the word "to" before "transmit a first message to a dynamic host control"

In Column 21, Line 16, remove the word "to" before "receive a second message from the DHCP server"

Signed and Sealed this
Tenth Day of June, 2025

Coke Morgan Stewart
*Acting Director of the United States Patent and Trademark Office*